United States Patent [19]
Lam

[11] Patent Number: 5,753,979
[45] Date of Patent: May 19, 1998

[54] HOST ELECTRONIC EQUIPMENT WITH INTERNAL POWER SUPPLY ADAPTED FOR SUPPLYING POWER DIRECTLY TO PERIPHERALS

[75] Inventor: Phillip L. Lam, Mission Viejo, Calif.

[73] Assignee: AM Group Corporation, Irvine, Calif.

[21] Appl. No.: 734,959

[22] Filed: Oct. 23, 1996

[51] Int. Cl.⁶ .................................................. H02J 1/00
[52] U.S. Cl. ........................... 307/28; 307/25; 307/38; 307/150; 307/42; 363/146; 364/492
[58] Field of Search ................... 307/75, 72, 43, 307/11, 18, 28, 38, 150, 155, 42; 363/146; 362/492; 364/948.4, 273.1–273.5, 492; 315/161

[56] References Cited

U.S. PATENT DOCUMENTS

| | | | |
|---|---|---|---|
| 4,674,031 | 6/1987 | Siska | 307/38 |
| 5,300,864 | 4/1994 | Allen | 307/11 |
| 5,506,790 | 4/1996 | Nguyen | 307/38 |
| 5,563,782 | 10/1996 | Chen et al. | 363/146 |
| 5,616,968 | 4/1997 | Fujii | 307/150 |

*Primary Examiner*—William M. Shoop, Jr.
*Assistant Examiner*—Albert W. Paladini
*Attorney, Agent, or Firm*—Herbert M. Shapiro

[57] ABSTRACT

Electrical equipment such as a personal computer includes a plurality of internal components which require different voltages including low voltages of about five volts for operation. The different voltages are supplied by an internal power supply, with a voltage regulator, which is itself connected to an appropriately transformed high voltage supply typically from an in-the-wall source. Peripherals such as a FAX/modem, CD ROM, or tape recorder are powered by special connectors in the face of the computer housing and connected to the appropriate outputs of the internal power supply to obtain low voltage power directly from the host computer in the absence of a transformed connection to a house supply.

12 Claims, 2 Drawing Sheets

HOST ELECTRONIC EQUIPMENT WITH INTERNAL POWER SUPPLY ADAPTED FOR SUPPLYING POWER DIRECTLY TO PERIPHERALS

FIELD OF THE INVENTION

This invention relates to electronic equipment to which auxiliary equipment is connected for cooperative system operation.

BACKGROUND OF THE INVENTION

The market is replete with electronic equipment to which peripheral equipment is connected for cooperative action. The personal computer is one example of equipment to which peripheral equipment such as a FAX/modem and a LABEL scanner are connected for communication purposes. Another example is the television set to which a video cassette recorder (VCR) is connected; another, a stereo system. A tape drive, which might be connected to any of the above hosts, is a particularly familiar peripheral. Each piece of peripheral equipment is connected separately to an in-the-wall socket for power, as well as to the host, leading to a tangle of cords characteristic of any PC installation, stereo system or video system.

The peripherals often require different DC voltage levels for operation. Thus, five volt, nine volt, and 12 volt requirements are not uncommon. Consequently, not only are the power cords common but they typically also require transformers. The transformers, in turn, not only further complicate the tangle of cords, but they also are expensive and not entirely reliable. Most individuals with systems of this type often find themselves complaining about the mess of wires providing further impetus for the significant effort now being expended to develope wireless communication links between components. But still the tangle of power cords and transformers remains.

BRIEF DESCRIPTION OF THE INVENTION

The invention is based on the recognition that host equipment such as a personal computer, a television set or a stereo tuner has an internal power supply and a voltage regulator which already provides low voltage requirements for internal components and can be adapted to permit the requisite low voltage power to be supplied for the peripheral equipment directly from the host equipment rather than separately through transformers to an in-the-wall supply. In this manner, the tangle of cords, characteristic of such systems, is considerably simplified. To this end, provision is made in the housing of the host to provide a socket, or sockets, to which a peripheral piece of equipment can be connected for receiving directly from the host the low voltage power it requires. The socket(s) are connected electrically to the outputs of the internal power supply (or regulator) of the host for providing the low voltage needed to power the peripheral.

DETAILED DESCRIPTION OF AN ILLUSTRATIVE EMBODIMENT OF THIS INVENTION

Figure 1:
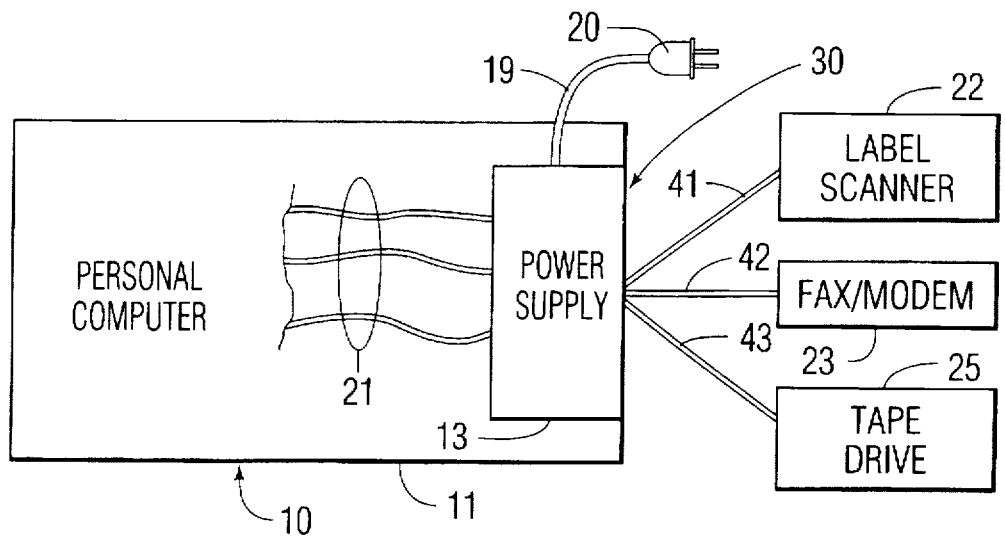
FIG. 1 is a block diagram of a personal computer system with a plurality of peripherals and an internal power supply with sockets for direct supply of power to associated peripherals.

FIG. 1 shows a personal computer 10 having a housing 11. A power supply 13 (with a voltage regulator (not shown) is shown within the housing. The power supply is connected to an in-the-wall socket (or equivalent) as indicated by cord 19 and plug 20. Power supply 13 is connected electrically to components (not shown) within the housing which constitute typical components for a computer for supplying DC power to those components as shown by wires 21. Typical peripherals for a computer are, for example, a LABEL scanner 22, a FAX/MODEM 23, and a tape drive (or CD ROM) 25 shown also connected to internal power supply 13.

Figure 2:
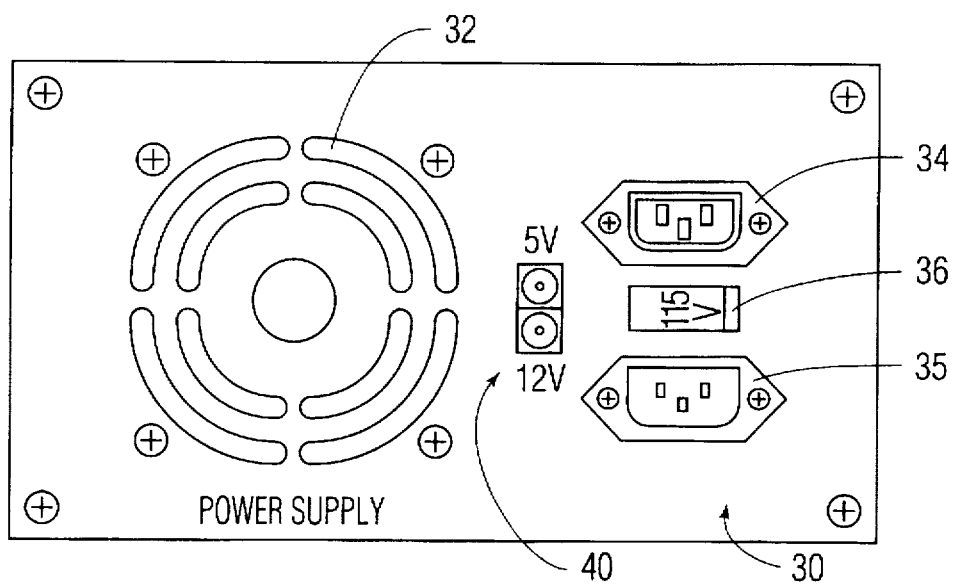
FIGS. 2 and 3 are schematic illustrations of portions of the computer of FIG. 1 showing sockets in the host computer housing for the direct supply of power to the peripherals in accordance with the principles of this invention.

FIG. 2 shows a face of a power supply for a personal computer in accordance with the principles of this invention. The power supply typically is secured within housing 11 with face 30 visible at an aperture in the computer housing.

The power supply includes a fan which is secured behind the pattern of curved openings 32. Also, sockets 34 and 35 are available for connection to the computer monitor and to wall power respectively. Typical power supplies also include a switch 36 for switching between 110 volt and 220 volt house supplies for the U.S. and for the European markets respectively.

But, in accordance with the principles of this invention, additional sockets 40 are provided in the computer housing, or in the face of the internal power supply if exposed at the computer housing, for direct connection of wires 41, 42, and 43 connecting the LABEL scanner, FAX/MODEM and tape drive respectively of FIG. 1 for supplying the low voltage requirements for those peripherals in the absence of connection to in-the-wall sockets and in the absence of transformers.

Each of sockets 40, illustratively, is shown as circular with a central pin for conforming to popular connector shapes for the illustrative peripherals. Of course, other connector shapes could be provided for connection to cables of alternative configurations. What is necessary, in accordance with the principles of this invention, is that low voltage outputs from a host's internal power supply are connected to newly provided sockets at the housing face of the host.

Figure 3:
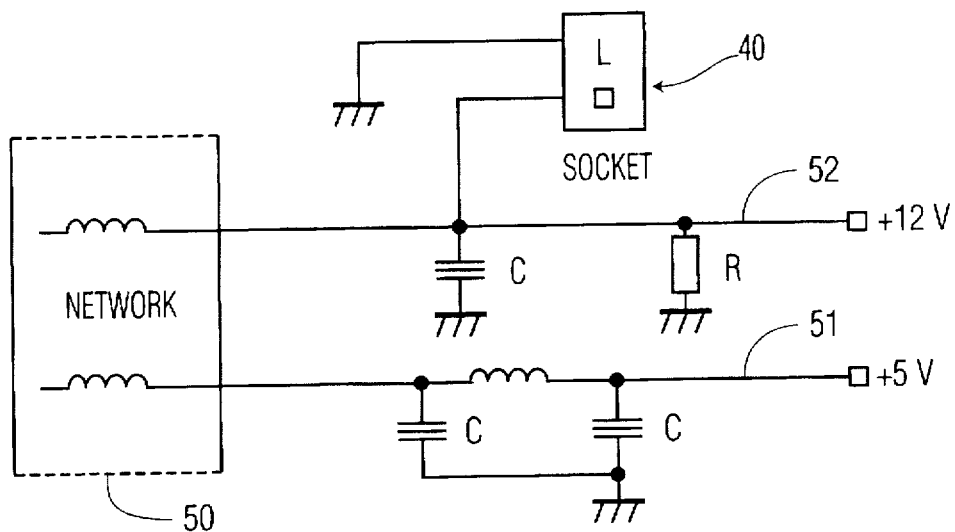

FIG. 3 shows a portion of a circuit schematic for the output of an illustrative internal power supply. The power supply includes a network 50 which permits plus five volts and plus twelve (and/or nine) volts supplies, for example, to be connected to sockets 40 of FIG. 2 via lines 51 and 52 respectively.

Although the invention has been described in connection with a personal computer, FIG. 1 could just as well represent a stereo system with associated peripherals or a television system with a video cassette and the like. In each instance, additional sockets, or connectors, are provided at the housing face for external connection of peripherals for supplying power thereto.

Figure 4:
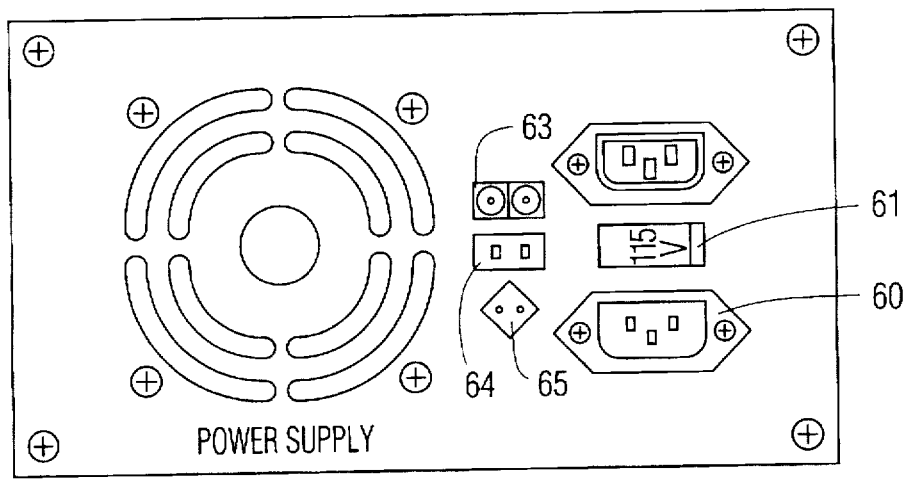
FIG. 4 is an alternative arrangement in accordance with this invention.

FIG. 4 shows an "internal" power supply similar to that shown in FIG. 2 where the sockets are of several different configurations. The arrangement includes a socket 60 for connection to house power as well as a switch 61 for selecting 110 or 220 volts. But, the sockets shown are circular (63) rectangular (64) and diamond shaped (65) for connection to cables of whatever shape dictated by the peripheral connector.

Figure 5:
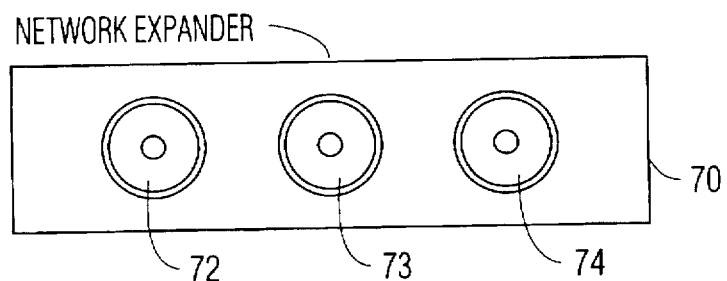
FIG. 5 is a schematic representation of a voltage expander for use with the arrangement of FIGS. 1, 2 and 4 in accordance with the principles of this invention.

If it is desirable for more auxiliary equipment to be powered from the host than there are receptacles, a voltage expander as shown in FIG. 5 may be used. Specifically, FIG. 5 shows an expander 70 with three receptacles 72, 73, and 74 each as shown, for example, at 40 in FIG. 2. The expander is configured to mate with one of the sockets (40), much in the manner of a triple plug mating with a wall socket, by a male plug on the reverse side (not shown) of the expander.

What is claimed is:

1. Electronic apparatus having a plurality of internal components which require different DC voltages for operation including a low voltage, said apparatus also including an internal power supply having a plurality of outputs for supplying said components with said voltage requirements including said low voltage, said apparatus having a housing and including at the face of said housing connectors attached directly via a resistor network to said outputs for providing thereat said low, voltages said connectors being of a configuration to mate with connectors from peripherals associated therewith.

2. Apparatus as in claim 1 wherein said apparatus is a computer and said peripherals include a FAX/MODEM.

3. Apparatus as in claim 1 wherein said connectors are sockets of like configuration.

4. Apparatus as in claim 1 wherein said connectors are sockets of different configuration.

5. Apparatus as in claim 1 wherein said apparatus comprises a stereo system amplifier and said peripherals includes a CD ROM.

6. Apparatus as in claim 1 wherein said low voltage comprises about five volts.

7. Apparatus as in claim 1 wherein said low voltage comprises about about twelve volts.

8. Apparatus as in claim 1 wherein said low voltage comprises about nine volts.

9. Electronic apparatus including a housing having a first surface and a plurality of components within said housing, said components being cooperative with one another for performing a plurality of system functions for which the apparatus is designed, said apparatus also including a power supply including a means for connection to an external source of power and having at least first and second outputs for supplying DC voltages of at least a first and a second level including a low voltage for said components, said components being electrically connected to appropriate ones of said outputs via a resistor network for supplying required voltages thereto, said apparatus also including a plurality of receptacles at said surface for mating with connectors from associated peripherals for supplying power thereto, said receptacles being connected to said outputs at which said voltages are provided.

10. Apparatus as in claim 9 wherein at least one of said peripherals is connected to the one of said first and second receptacles at which said low voltage is provided.

11. Apparatus as in claim 10 wherein others of said peripherals are connected to the other of said first and second receptacles.

12. A system comprising a personal computer having a plurality of internal components and an internal power supply having outputs for supplying different required DC voltages to said components, said computer being operative with a plurality of peripherals, said computer having a housing, said housing having at the face thereof a socket for accepting an electrical connector from said one of said peripherals, said socket being connected via a resistor network to said internal power supply and adapted to supply to a connected peripheral the requisite voltage required thereby for operation in the absence of a power connection to an in-the wall power source.

* * * * *